United States Patent
El Hawary et al.

(10) Patent No.: US 12,139,404 B2
(45) Date of Patent: Nov. 12, 2024

(54) METHOD AND DEVICE FOR CARRYING OUT A WATER-GAS SHIFT REACTOR

(71) Applicants: thyssenkrupp Industrial Solutions AG, Essen (DE); thyssenkrupp AG, Essen (DE)

(72) Inventors: Tarek El Hawary, Holzwickede (DE); Alexander Kleyensteiber, Fröndenberg (DE)

(73) Assignees: thyssenkrupp Uhde GmbH, Dortmund (DE); thyssenkrupp AG, Essen (DE)

(*) Notice: Subject to any disclaimer, the term of this patent is extended or adjusted under 35 U.S.C. 154(b) by 866 days.

(21) Appl. No.: 16/973,076

(22) PCT Filed: Jun. 7, 2019

(86) PCT No.: PCT/EP2019/064910
§ 371 (c)(1),
(2) Date: Dec. 8, 2020

(87) PCT Pub. No.: WO2019/234208
PCT Pub. Date: Dec. 12, 2019

(65) Prior Publication Data
US 2021/0246021 A1    Aug. 12, 2021

(30) Foreign Application Priority Data
Jun. 8, 2018   (DE) .................... 10 2018 113 743.5

(51) Int. Cl.
*C01B 3/16* (2006.01)
*C01B 3/14* (2006.01)

(52) U.S. Cl.
CPC .................. *C01B 3/16* (2013.01); *C01B 3/14* (2013.01); *C01B 2203/0233* (2013.01);
(Continued)

(58) Field of Classification Search
None
See application file for complete search history.

(56) References Cited

U.S. PATENT DOCUMENTS

| 2006/0096298 A1* | 5/2006 | Barnicki | ................ C10K 1/004 60/39.12 |
| 2009/0221720 A1 | 9/2009 | Belt | |

(Continued)

FOREIGN PATENT DOCUMENTS

| CN | 103508416 B | 1/2014 |
| WO | 2015131818 A | 9/2015 |

OTHER PUBLICATIONS

English Translation of International Search Report issued in PCT/EP2019/064910, dated Aug. 28, 2019.

*Primary Examiner* — Colin W. Slifka
(74) *Attorney, Agent, or Firm* — thyssenkrupp North America, LLC

(57) ABSTRACT

A process for performing the water gas shift reaction wherein raw synthesis gas is reacted in the presence of steam and at least one water gas shift catalyst to convert carbon monoxide into carbon dioxide and to form hydrogen. The raw synthesis gas is initially passed through at least one unit for high-temperature CO conversion and subsequently, downstream thereof, passed through at least one unit for low-temperature CO conversion. After passing through the at least one unit for high-temperature CO conversion the synthesis gas stream is divided into at least two substreams. The first substream is passed through a first unit for low-temperature CO conversion and the second substream is passed through a second unit for low-temperature CO conversion, wherein both units for low-temperature CO conversion are arranged in parallel relative to one another.

9 Claims, 1 Drawing Sheet

(52) U.S. Cl.
CPC ......... *C01B 2203/0294* (2013.01); *C01B 2203/1076* (2013.01); *C01B 2203/1614* (2013.01)

(56) References Cited

U.S. PATENT DOCUMENTS

| | | | |
|---|---|---|---|
| 2011/0067306 A1* | 3/2011 | Balmas | ............... C01B 3/12 252/373 |
| 2011/0104037 A1 | 5/2011 | Stahl | |
| 2012/0291481 A1 | 11/2012 | Terrien | |
| 2014/0264178 A1 | 9/2014 | Abbott | |
| 2015/0044120 A1 | 2/2015 | Singh | |
| 2016/0264411 A1 | 9/2016 | Filippi | |

\* cited by examiner

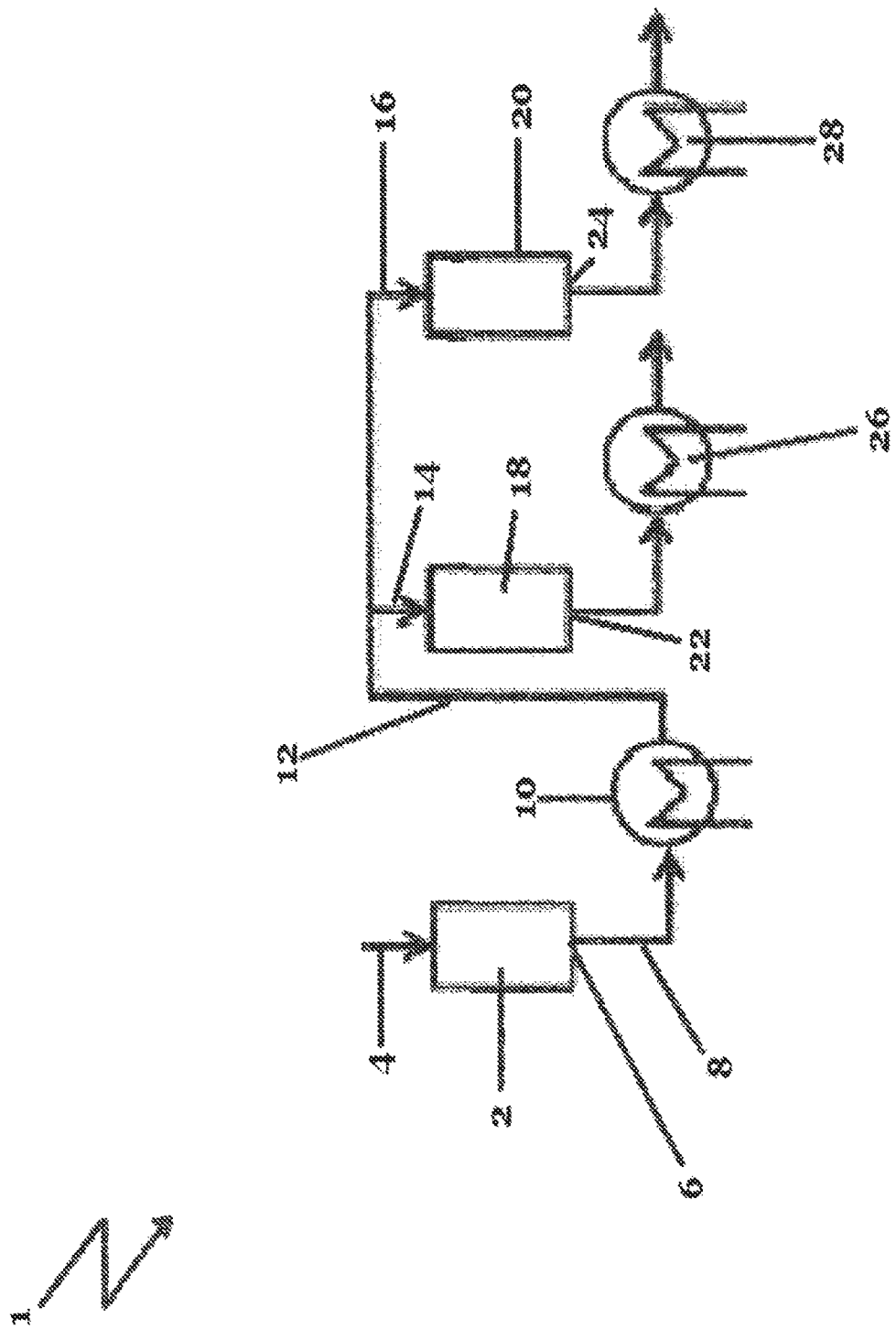

METHOD AND DEVICE FOR CARRYING OUT A WATER-GAS SHIFT REACTOR

CROSS REFERENCE TO RELATED APPLICATIONS

This application is a U.S. National Stage Entry of International Patent Application Serial Number PCT/EP2019/064910, filed Jun. 7, 2019, which claims priority to German Patent Application No. DE 10 2018 113 743.5, filed Jun. 8, 2018, the entire contents of both of which are incorporated herein by reference.

FIELD

The present disclosure generally relates to a process for performing the water gas shift reaction.

BACKGROUND

Synthesis gas is often produced on an industrial scale by the so-called steam reforming process from gaseous hydrocarbons and steam at high pressures in the presence of a catalyst. The employed source of these hydrocarbons is often natural gas which generally contains more than 75% methane. In addition to hydrogen synthesis gas contains carbon monoxide as a further key reaction product. Carbon monoxide can often coordinate well to metal centers as a ligand to form complex compounds and therefore often acts as a catalyst poison, especially also in ammonia production. It is therefore to be removed from the raw synthesis gas mixture before further use of the hydrogen, for example in ammonia synthesis. This is often done using the water gas shift reaction wherein carbon monoxide is reacted with steam in the presence of a suitable catalyst to afford carbon dioxide and hydrogen. In contrast to carbon monoxide, carbon dioxide does not act as a catalyst-poisoning coordination ligand and is also much easier to remove from the product gas mixture. The conversion of carbon monoxide into carbon dioxide in the water gas shift reaction is strongly exothermic.

If the hydrogen derived from the synthesis gas is to be used for ammonia synthesis it is necessary not only for the proportion of carbon monoxide to be extremely low and preferably to have been completely removed but also for the proportion of methane to be low.

This is because the water gas shift reaction is often performed on the raw synthesis gas mixture which is subsequently used in ammonia synthesis.

Theory of Water Gas Shift Reaction

The production of hydrogen through steam reforming forms the byproduct carbon monoxide which is highly toxic and removable from gas mixtures only with great difficulty. An elegant conversion into easily removable carbon dioxide in a water gas shift reaction even allows additional hydrogen to be produced:

$$CO+H_2O \leftrightarrow CO_2+H_2$$

The reaction is strongly exothermic which has the disadvantage that at high temperatures the equilibrium is shifted in the direction of the reactants and significant amounts of carbon monoxide remain in the product gas mixture. If, by contrast, the water gas shift reaction is carried out at relatively low temperatures the reaction equilibrium does favor the reaction products but the reaction proceeds very slowly.

In industry the reaction is performed in three different temperature ranges, as a high-temperature, medium-temperature and low-temperature shift, depending on the application profile. These differ in their entry temperatures wherein higher temperatures typically allow treatment of higher entry concentrations of carbon monoxide while lower temperatures achieve lower exit concentrations of carbon monoxide. Each temperature level has specialized catalysts which may differ markedly in their composition and in their operating range.

The shift in the equilibrium position toward the reactants as a result of the temperature increase during the reaction means that the reaction must typically be performed in a multistage procedure with intermediate cooling. It is customary to cool the process gas to such an extent that downstream reactors occupy a lower temperature level, usually a high-temperature shift and a low-temperature shift. This arrangement makes it possible to achieve the lowest possible concentrations of remaining carbon monoxide while simultaneously minimizing the amount of employed catalyst.

The medium-temperature shift is usually operated as a single bed without a second stage, especially in processes in which the water proportion of the gas stream is smaller than is typical for ammonia plants. Since the catalyst is stable at higher temperatures than in the case of the low-temperature shift (LTS), the medium-temperature shift (MTS) can treat a higher entry concentration of carbon monoxide.

A low exit concentration of carbon monoxide is desirable since carbon monoxide would poison the ammonia synthesis catalyst. It is therefore converted into methane in a subsequent reaction step but this requires three equivalents of hydrogen:

$$CO+3H_2 \leftrightarrow CH_4+H_2O$$

A reduced residual content of CO thus results in increased feeding of hydrogen into the synthesis loop and thus in a higher production of ammonia at constant consumption of natural gas.

US 2014/0264178 A1 describes a combination of a plurality of serial CO shifts, wherein a total of four water gas shift reactors through which the synthesis gas flows are provided. The synthesis gas is cooled in respective heat exchangers between the reactors so that the downstream CO shifts are carried out at lower temperatures than the first CO shift. This document at one point indicates the possibility of a parallel arrangement of a plurality of CO shift reactors but there is no specific disclosure to this effect in the examples.

In one working example of US patent specification 2012/0291481 A1 only one CO shift reactor is depicted but the text indicates that the water gas shift reaction may have a plurality of stages. These may be for example three CO shift stages; a high-temperature shift, a medium-temperature shift and a low-temperature shift. However, these CO shift stages are arranged in series. A further low-temperature shift reactor which is arranged downstream of the other CO shift reactor(s) and in series therewith may optionally also be provided. This document is silent about connection in parallel.

US patent specification 2015/0044120 A1 indicates that a first CO shift converter may comprise two or more reactors arranged in series or parallel. A plurality of medium-temperature converters or a plurality of low-temperature converters may also be used. However, the working example specifically discloses only one HT shift and one LT shift in series—a conventional setup. The wording "or arranged in parallel" refers only to the shift converter shown in the example as a whole which comprises HT shift and LT shift, so that this publication specifically does not disclose an embodiment having two LT shifts connected in parallel.

Thus, a need exists to virtually or even completely remove carbon monoxide from synthesis gas deriving from the steam reforming process. In particular, a need exists to increase the hydrogen yield starting from the steam reforming process. Finally, a need exists to achieve the highest possible yields and efficient process management in ammonia synthesis using hydrogen deriving from the steam reforming process.

A solution to the problem presented in the prior art can be achieved by a process for performing the water gas shift reaction comprising units for high-temperature and low-temperature CO conversion according to the disclosure.

BRIEF DESCRIPTION OF THE FIGURE

FIG. 1 is a schematic diagram of an exemplary variant of the apparatus.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to a process for performing the water gas shift reaction wherein raw synthesis gas is reacted in the presence of steam and at least one water gas shift catalyst to convert carbon monoxide into carbon dioxide and to form hydrogen, wherein the raw synthesis gas is initially passed through at least one unit for high-temperature CO conversion and subsequently, downstream thereof, passed through at least one unit for low-temperature CO conversion.

According to the invention it is provided that after passing through the at least one unit for high-temperature CO conversion the synthesis gas stream is divided into at least two substreams, wherein the first substream is passed through a first unit for low-temperature CO conversion and the second substream is passed through a second unit for low-temperature CO conversion, wherein both units for low-temperature CO conversion are arranged in parallel relative to one another.

According to the invention the raw synthesis gas obtained from synthesis gas production, for example by means of the steam reforming process, is initially subjected to a water gas shift reaction under high-temperature CO conversion conditions and then optionally cooled and subsequently divided into at least two substreams which are separately, i.e. in parallel, further reacted under low-temperature CO conversion conditions in at least one water gas shift reaction in each case.

In an alternative embodiment it is also possible in this case to initially split the product gas mixture deriving from the high-temperature CO conversion and then cool the substreams individually before these are each subjected to a low-temperature CO conversion in separate units.

In a first preferred variant of the process according to the invention after flowing through the at least one unit for high-temperature CO conversion the synthesis gas stream is divided into two substreams which each comprise a proportion of 40% by volume to 60% by volume of the total synthesis gas stream after the high-temperature CO conversion, preferably into two substreams of approximately equal size which each comprise about 50% by volume of the total synthesis gas stream after the high-temperature CO conversion.

Alternatively after flowing through the at least one unit for high-temperature CO conversion the synthesis gas stream may however also be divided into two substreams of unequal size, wherein a first substream comprises a proportion of 95% by volume to 65% by volume, preferably a proportion of for example 85% by volume to 65% by volume, of the total synthesis gas stream after the high-temperature CO conversion and a second substream comprises a proportion of 5% by volume to 35% by volume, preferably a proportion of 15% by volume to 35% by volume, of the total synthesis gas stream after the high-temperature CO conversion.

It is preferable in the process according to the invention when the entry temperature of the raw synthesis gas into the high-temperature CO conversion is in the range of 350-400° C.

It is further preferable in the process according to the invention when the maximum exit temperature of the synthesis gas stream from the high-temperature CO conversion is in the range of 430-450° C.

In a development of the process it is preferable when after exiting the high-temperature CO conversion and before entering the two units for low-temperature CO conversion the synthesis gas stream is cooled by means of a cooling unit, preferably by means of a heat exchanger, so that the entry temperature upon entry into the two units for low-temperature CO conversion is in the range from 180° C. to 220° C.

It is further preferable in the process according to the invention when the maximum exit temperature of the synthesis gas stream from the two units for low-temperature CO conversion is in the range from 220 to 240° C.

The abovementioned entry and exit temperatures define what is to be understood by a high-temperature CO conversion and a low-temperature CO conversion in the context of the present invention.

In a development of the process according to the invention the preferred entry concentration of carbon monoxide in the raw synthesis gas upon entry into the high-temperature CO conversion is in the range from about 10 mol % to 16 mol % and the exit concentration of carbon monoxide in the synthesis gas stream upon exiting the high-temperature CO conversion and upon entering the low-temperature CO conversion is in each case in the range from about 3 mol % to 5 mol %.

By contrast it is preferable when the exit concentration of carbon monoxide in the synthesis gas stream upon exiting the low-temperature CO conversion is less than 0.8 mol %, preferably less than 0.6 mol %, particularly preferably less than 0.4 mol %. This illustrates that the low-temperature CO conversion further considerably reduces the concentration of carbon monoxide in the synthesis gas stream, for example to one eighth to one thirteenth of the carbon monoxide concentration upon exiting the high-temperature CO conversion.

Suitable water gas shift catalysts may be selected for example from the group consisting of iron oxide, nickel oxide, cobalt oxide, tungsten oxide, chromium oxide, molybdenum oxide or any desired mixtures thereof. The abovementioned catalysts are preferably used for high-temperature CO conversion. Catalysts suitable for low-temperature CO conversion often include the catalysts copper, zinc, chromium, tungsten, silicon, palladium and molybdenum, either in elemental form or in the form of compounds of these metals. Water gas shift catalysts for high-temperature and low-temperature CO conversion are known to those skilled in the art and also commercially available. The pressures employed in these conversions are also familiar to those skilled in the art.

In the process according to the invention the water gas shift reaction in the high-temperature CO conversion is for example carried out in the presence of an iron-containing catalyst which preferably contains not only iron but also chromium and copper, where the latter are present in the catalyst in smaller amounts than iron.

The catalyst for the low-temperature CO conversion may differ from the abovementioned catalyst. Thus for example the water gas shift reaction in the low-temperature CO conversion may be carried out in the presence of a copper-containing catalyst which preferably contains not only copper but also zinc and aluminum, where the latter are present in the catalyst in smaller amounts than copper.

The present invention further provides an apparatus for performing the water gas shift reaction, especially by a process according to any of the preceding claims, comprising at least one unit for high-temperature CO conversion, at least one first and one second unit for low-temperature CO conversion which are connected downstream of the unit for high-temperature CO conversion in the flow path, at least one unit for cooling the product gas mixture withdrawn from the unit for high-temperature CO conversion, wherein provided in the conduit system downstream of the unit for cooling according to the invention is a means for dividing the product gas mixture into two substreams and wherein a first unit for low-temperature CO conversion and a second unit for low-temperature CO conversion are arranged parallel relative to one another and downstream of the means for dividing in such a way that each of them is traversable by only one of the two substreams.

In an advantageous development of the invention this apparatus preferably comprises an exit conduit from the unit for high-temperature CO conversion which divides into at least two conduits, namely a conduit for the first substream which leads to the first unit for low-temperature CO conversion and a conduit for the second substream which leads to the second unit for low-temperature CO conversion.

In an advantageous development of the invention it is preferable when the second unit for low-temperature CO conversion has only a fraction of the size and/or the plant capacity of the first unit for low-temperature CO conversion and/or the second unit for low-temperature CO conversion contains only a fraction of the catalyst amount present in the first unit for low-temperature CO conversion.

In a preferred development of the invention it is preferable when the fraction of the size and/or the plant capacity and/or the catalyst amount of the second unit for low-temperature CO conversion relative to the first unit for low-temperature CO conversion is in the range from 0.15 times to 0.4 times.

In an advantageous development of the invention it is preferable when the apparatus comprises at least one second unit for cooling the product gas mixture which in the flow path is arranged downstream of the first unit for low-temperature CO conversion and does not have the product gas mixture exiting the second unit for low-temperature CO conversion flow through it and/or the apparatus comprises at least one third unit for cooling the product gas mixture which in the flow path is arranged downstream of the second unit for low-temperature CO conversion and does not have the product gas mixture exiting the first unit for low-temperature CO conversion flow through it.

Cooling following a low-temperature CO conversion generally cannot be dispensed with. This is because a product gas mixture introduced into the unit for low-temperature CO conversion at an entry temperature in the range from 180 to 220° C., for example, often exits said unit at a temperature in the range from for example 210 to 240° C. on account of the exothermic character of the conversion.

In the process according to the invention the amount of water-gas shift catalyst is advantageously high enough to ensure that a significant shift toward the equilibrium position of the water gas shift reaction with increased formation of carbon dioxide is achieved. Without wishing to be tied to any particular theory it is presently thought that the increased shift toward the equilibrium position may be attributed to the inventive parallel interconnection and/or the performed intermediate cooling.

The process according to the invention moreover advantageously comprises removal of carbon dioxide from the product gas mixture after the low-temperature CO shift reaction, especially when it is a constituent of a process for producing ammonia from synthesis gas. Suitable separation apparatuses which may be used to perform a so-called $CO_2$ scrubbing for example are familiar to those skilled in the art. The removal of carbon dioxide may be effected for example using selective chemical and/or physical adsorbents. This may be achieved inter alia using countercurrent processes known to those skilled in the art in which the product gas mixture from the carbon monoxide conversion is contacted with an adsorption medium.

If synthesis gas is obtained with the steam reforming process for example in order subsequently to be used for producing ammonia the processes according to the invention may readily be integrated into the process management required therefor. The steam reformer process typically employs a primary reformer and a secondary reformer. The steam reforming process may alternatively employ an alternative apparatus for producing synthesis gas/an alternative source for synthesis gas instead of a primary reformer, for example the Haldor-Topsoe exchange reformer. Primary reforming generally comprises passing gaseous hydrocarbons through tube systems containing the reforming catalyst. In primary reforming the gaseous hydrocarbons, usually methane, are converted into hydrogen and carbon monoxide in the presence of steam. In the subsequent secondary reforming here hydrocarbons remaining in the product gas mixture are generally converted into carbon dioxide and hydrogen in the presence of oxygen and a reforming catalyst. The resulting raw synthesis gas contains not only hydrogen but also significant amounts of carbon monoxide.

In a preferred embodiment the secondary reforming is accordingly followed by the carbon monoxide conversion process according to the invention. This makes it possible to once more significantly reduce the carbon monoxide content. It is also possible alternatively or in addition to install the processes according to the invention between primary and secondary reforming.

The reduction of the residual content of carbon monoxide in the synthesis gas also allows the ultimate proportion of methane in the product gas mixture used for ammonia production to be kept low. This is because removal of contents of carbon monoxide still remaining after carbon monoxide conversion is often achieved using a so-called methanization in which carbon monoxide is reacted with hydrogen to afford methane and water. Reduction or complete elimination of the methanization makes it possible to prevent dilution of the synthesis gas by inert gases. More hydrogen is effectively also available for ammonia production and total consumption of hydrogen can therefore be reduced.

The process according to the invention makes it possible to achieve a carbon monoxide concentration of the withdrawn product gas mixture of not more than 0.30 mol %, preferably not more than 0.28 mol % and particularly preferably not more than 0.26 mol %.

In a further development of the process according to the invention it is moreover possible to withdraw from the unit for low-temperature CO conversion a total stream of product gas mixture in the range from 15 000 to 25 000 kmol/h, preferably in the range from 18 000 to 23 000 kmol/h, for example. The recited values for the total stream are to be understood as being merely exemplary and apply to large plants having a production of 3300 t/d (tons per day) for example. For smaller plants of 1100 t/d for example the amounts of product gas mixture that may be withdrawn are correspondingly smaller.

In a preferred embodiment the apparatus according to the invention comprises:
at least one unit for high-temperature CO conversion,
at least one first and one second unit for low-temperature CO conversion,
at least one unit for cooling the product gas mixture withdrawn or withdrawable from the unit for high-temperature CO conversion,
wherein the unit for cooling the product gas mixture withdrawn or withdrawable from the unit for high-temperature CO conversion or optionally a unit arranged downstream thereof is adapted and configured to divide the cooled product gas mixture and to pass the substreams to the first and second unit for low-temperature CO conversion and
optionally a unit for cooling the product gas mixture withdrawn or withdrawable from the first unit for low-temperature CO conversion and/or a unit for cooling the product gas mixture withdrawn or withdrawable from the second unit for low-temperature CO conversion.

Suitable units for cooling a product gas mixture are known to those skilled in the art. Heat exchangers are often employed therefor.

The process according to the invention and the apparatus according to the invention are suitable especially for use in the production of synthesis gas and/or in the production of ammonia. The present invention accordingly likewise claims the use of at least two units for low-temperature CO conversion in addition to at least one unit for high-temperature CO conversion for performing the water gas shift reaction, wherein the at least two units for low-temperature CO conversion are connected in parallel.

The present invention accordingly further provides for the use of a synthesis gas stream depleted in carbon monoxide by water gas shift reaction and obtained by the above-described process and for the use of the above-described apparatus for performing the water gas shift reaction in a process for producing ammonia.

The variant of an apparatus 1 according to the invention shown in FIG. 1 comprises, as shown in FIG. 1, a unit 2 for high-temperature CO conversion having a feed conduit 4 for raw synthesis gas for example and an outlet 6 for the product gas mixture. The high-temperature CO conversion of the carbon monoxide from the raw synthesis gas may be performed for example at temperatures in the range of about 370° C. The product gas mixture withdrawn from the unit 2 is supplied via a conduit 8 to a cooling unit 10, for example a heat exchanger, and in one embodiment cooled down to temperatures in the range of 200° C. After exiting the cooling unit 10 the cooled product gas mixture is split. This may be accomplished for example by the exit conduit 12 dividing into a conduit 14 for the first substream and a conduit 16 for the second substream. In this way the substreams are supplied to separate first and second low-temperature CO conversion units 18 and 20. These perform the carbon monoxide conversion in the presence of a catalyst at temperatures in the range of for example 200° C. Since the conversion of carbon monoxide into carbon dioxide is strongly exothermic the product gas mixture undergoes heating during residence in the first and in the second low-temperature CO conversion unit 18, 20. After exiting this unit via the outlets 22 and 24 the product gas substreams are once again cooled down via cooling units 26 and 28.

The present invention is more particularly elucidated hereinbelow with reference to specific examples.

In the water gas shift reaction a distinction is made between three types which are classified and described according to the reaction temperatures prevailing in each case, namely high-temperature shift (HT shift or HTS for short),
medium-temperature shift (MT shift for short) and
low-temperature shift (LT shift or LTS for short), wherein medium-temperature shift has no particular significance for the process according to the present invention.

The following operating conditions are contemplated by way of example for the two types of shift reaction relevant here:
High-temperature shift
  entry temperature 350-400° C. (370° C. in typical design)
  exit temperature 400-440° C. (limited, to prevent sintering of the catalyst)
  entry concentration of CO 13 mol % (excluding water)
  exit concentration of CO 4 mol-%
  catalyst: KATALCO 71-5 from Johnson Matthey Catalyst
  composition: Fe (88%), Cr (9%), Cu (3%)
Low-temperature shift
  entry temperature 180-220° C. (200° C. in typical design)
  exit temperature 200-230° C. (limited, to prevent sintering of the catalyst)
  entry concentration of CO 3-5 mol % (excl. water)
  exit concentration of CO 0.2-0.5 mol %
  catalyst: KATALCO 83-3 from Johnson Matthey
  composition: Cu (51%), Zn (31%), Al (18%)
The medium-temperature shift also used in the prior art is preferably run with the following operating conditions:
  entry temperature 200-230° C.
  exit temperature 300-350° C. (limited, to prevent sintering of the catalyst)

entry concentration of CO for example 9 mol-% (excl. water)

exit concentration of CO for example 0.5 mol % mol-%.

Comparative Example

In this first example the capacity of an existing plant for performing the water gas shift reaction is to be expanded. This exemplary variant of the invention is hereinbelow referred to as case 0. Capacity expansion is to be carried out according to the following parameters.

Original capacity: 3300 t/d of ammonia
Capacity expansion: 20%→3960 t/d (tons per day) of ammonia
HT shift: 82.6 m³ of KATALCO 71-5 (see above) catalyst
LT shift: 139 m³ of KATALCO 83-3 (see above) catalyst
Calculated lifetime 5 years

|  | $CO_2$ mol % (dry) | CO | Dry gas kmol/h | $H_2O$ | Temperature ° C. |
|---|---|---|---|---|---|
| HTS inlet | 6.96 | 13.4 | 18757 | 8894 | 370 |
| HTS outlet | 15.18 | 3.38 | 20574 | 7077 | 442 |
| LTS inlet | 15.18 | 3.38 | 20574 | 7077 | 200 |
| LTS outlet | 17.69 | 0.33 | 21199 | 6451 | 226 |

Capacity Expansion

It would in principle be conceivable to increase the capacity of the plant to a certain extent without performing alterations to the reactors for the CO shift. The increased catalyst space velocity, i.e. the amount of gas that is treated by an amount of catalyst per hour, would increase, thus shortening the contact time of the gas with the catalyst and leading to an increase in the exit concentration of carbon monoxide due to a greater distance from equilibrium. This is not particularly restrictive with fresh catalyst but markedly reduces the lifetime of the catalyst.

The lifetime of shift catalysts is limited by progressive poisoning by chlorides and other catalyst poisons. The amount of catalyst is therefore chosen such that after the specified lifetime the desired exit concentration may still be achieved by adding to the catalyst amount required therefor an amount which is inactive at the end of this lifetime due to poisoning. Catalyst employed beyond this required amount is available as a reserve and increases the lifetime of the bed. The poisoning therefore has the effect that fresh catalyst allows exit concentrations markedly below the design value since more than the required amount of catalyst is available and said concentration exponentially approaches the design value towards the end of the lifetime. In practice the catalyst is operated until the pressure drop associated with the poisoning renders operation uneconomic or the elevated exit concentration of carbon monoxide results in losses of hydrogen high enough to render operation uneconomic.

A capacity expansion by 20% to 3960 t/d where the lifetime of the catalyst is to be maintained therefore requires the provision of additional catalyst. Since an expansion of ammonia production results in a largely linear increase in the process gas stream through the CO shift, the stream at the entry to the HTS would be about 526271 kg/h after the expansion. After a lifetime of 5 years the setup of a parallel LTS reactor comprising 34.8 m³ of catalyst results in the same exit concentration of 0.33 mol % (dry) of carbon monoxide as in the main tract when 20% of the total gas stream are passed through the parallel secondary tract. The pressure drop over the parallel tract is dependent on reactor geometry but in this example should be precisely equal to that over the main tract. This case is hereinbelow referred to as case 1.

Especially in the course of a revamp, but in some cases also in the course of planning a new plant, divergence from this concept may be advantageous. If the low-temperature shift reaction is performed in two parallel reactors this may have positive effects on:

plant capacity
exit concentration
pressure drop
service life of the catalyst

The objectives according to which these aspects are desired in the present case determines the size of the parallel reactor and the amount and distribution of the catalyst.

Sticking with the above example of a 20% capacity increase the following three cases may be distinguished.

Example 1 (Inventive)

Parallel low-temperature shift with 16.7% of the total stream and the amount of catalyst required according to the configuration.

The plant capacity is increased by treatment of the additional gas exclusively in the parallel reactor. The required amount of catalyst is more than 20% of the previous volume since elevated flow causes the exit concentration of the high-temperature shift to fall and additional catalyst is required to compensate this. Based on the above example in which 34.8 m³ of catalyst are required to achieve a 20% production increase, only 139 m³*0.2=27.8 m³ are required to achieve the exit concentration and the remaining 7 m³ are required for compensation.

In this case the exit concentration is just as high as in the original plant since the amount of the additional catalyst corresponds to the additional amount of gas. $c_{CO}$=0.33 mol % (dry)

The pressure drop over the parallel unit depends on the reactor geometry, i.e. on the height of the catalyst bed. Since the pressure drop over the existing tract is unchanged an optimization of the new tract to below this value is unnecessary since both tracts should have the same pressure drop to achieve the desired flow ratios. In the present example the pressure drop $\Delta p$=0.59 bar.

The service life of the catalyst is not affected since the amount of employed catalyst corresponds to the amount of additional gas. The expected lifetime remains at 5 years.

Example 2 (Inventive)

Parallel low-temperature shift with 35.2% of the total stream and more than the required amount of catalyst according to the configuration.

This variant is based on providing more than the amount of catalyst strictly necessary according to the configuration and partial relocation of process gas into the parallel tract. This reduces the catalyst space velocity and the increased contact time of the gas with the catalyst allows the reaction to better approach equilibrium.

Since the plant capacity is determined by the amount of the process gas flowing through it this variant has only indirect advantages over example 1.

The increased amount of catalyst allows a lower exit concentration to be achieved since the reaction is brought closer to its equilibrium. This results in reduced losses of hydrogen for reaction with the remaining carbon monoxide.

Increasing the amount of catalyst to 75.6 m³ reduces the exit concentration of the low-temperature shift to 0.23 mol %. In the present example in the further process this saves 104 kmol/h of hydrogen which would have been necessary to react with the difference in carbon monoxide. This amount of hydrogen could in turn be used to produce 69 kmol/h of ammonia, or an amount of 28.3 t/d.

Due to the elevated amount of catalyst compared to example 1 the design of the reactor must be chosen with care to avoid an additional pressure drop. If this is constructionally no longer possible a slightly higher pressure drop will be established in the parallel tract.

The elevated amount of catalyst increases the lifetime of the two beds to 6.8 years until the desired exit concentration of 0.3 mol % (dry) is exceeded.

Example 3 (Inventive)

Two parallel low-temperature shift apparatuses with division of the synthesis gas stream in the same ratio into two substreams, passage of respectively 50% of the total stream through each of the two parallel low-temperature CO shift apparatuses and use of the amount of catalyst required according to the configuration.

This variant is based on the concept that process gas passes through the parallel tract instead of through the existing tract. The maximum effect is achieved when the distribution between the streams is precisely 50:50. The amount of catalyst must be at least high enough to ensure that it can treat half of the total amount of process gas. An appropriate amount of catalyst is withdrawn from the existing tract. In the present example both reactors would therefore be filled with 86.9 m³ of catalyst respectively.

This variant has no direct effect on plant capacity since only a spatial relocation of the reaction is carried out. However, the reduction in pressure drop allows for increasing of the maximum possible capacity.

As in the two previous cases any possible reduction in the exit concentration of carbon monoxide is dependent on an additionally introduced amount of catalyst. This is possible but would run counter to the fundamental concept of this case.

The reduction in the amount of catalyst and the accompanying reduction in the bed height in the existing tract markedly reduces the pressure drop over the low-temperature shift. In this example the pressure drop over the catalyst bed is reduced from 0.59 bar at 139 m³ to 0.11 bar at 86.9 m³ per bed. This reduction in the pressure drop saves energy when operating the upstream compressors which in turn has a positive effect on the economy of the plant. Since in the case of capacity increases the overall pressure drop over the plant may approach the maximum pressure increase of the upstream compressors and these thus limit the maximum capacity of the plant, a setup as in this case can increase the maximum plant capacity by reducing the pressure drop. In this case the maximum capacity is reached at 120.4% of the nominal capacity since the pressure profile becomes limiting. By reducing the pressure drop by setting up the low-temperature shift as in this case, the maximum capacity of the plant may be increased to 122.4% of the nominal capacity which corresponds to an amount of ammonia of 63.2 t/d. Not only the achievable exit concentration but also the lifetime of the low-temperature shift are affected by additional amounts of catalyst. This is possible but would run counter to the general idea of this case.

The following table summarizes the three examples described hereinabove and the comparative example:

| Variant | Flow distribution [%] | | Catalyst [m³] | | $c_{CO}$ [mol % (dry)] | | Pressure drop [bar] | | Lifetime [y] | |
| --- | --- | --- | --- | --- | --- | --- | --- | --- | --- | --- |
| | LTS 1 | LTS 2 | LTS 1 | LTS 2 | LTS 1 | LTS 2 | LTS 1 | LTS 2 | LTS 1 | LTS 2 |
| 0 | 83.3 | 0 | 139 | | 0.33 | | 0.59 | | 5 | |
| 1 | 83.3 | 16.7 | 139 | 34.8 | 0.33 | 0.33 | 0.59 | 0.59 | 5 | 5 |
| 2 | 64.8 | 35.2 | 139 | 75.6 | 0.23 | 0.23 | 0.4 | 0.4 | 6.8 | 6.8 |
| 3 | 50 | 50 | 86.9 | 86.9 | 0.33 | 0.33 | 0.11 | 0.11 | 5 | 5 |

The results of the examples reported above show that in the context of the present invention it is advantageous for example in the construction of new plants or in the course of revamps to provide existing plants with an additional parallel low-temperature shift apparatus in which 0-50% of the total catalyst amount is employed and in which 0-50% of the total synthesis gas stream is treated.

Sought in the context of the invention are capacity increases of up to 100% of the previous capacity, preferably of at least about 10%, for example 10% to 13%, in order to achieve an increase in ammonia production. However, in advantageous cases capacity increases of for example up to 20% are quite realistic.

It is a further object of the invention to reduce the pressure drop by relocation of the process gas from the primary tract, in some cases even with reduction of the catalyst amount in the primary reactor, to 0.1 to 0.5 bar, preferably 0.1 to 0.4 bar, depending on the application in order thus to improve the energy efficiency of the process.

It is a further objective of the invention to reduce the exit concentration of carbon monoxide from 0.05 to 0.5 mol % (dry), preferably to about 0.2 mol % (dry), which results in an increase in the ammonia yield.

It is a further objective of the invention to extend the lifetime of the plant, until the maximum allowed exit concentration is achieved, by up to 5 years, preferably by at least about 2 years, in order thus to reduce catalyst costs.

Appropriate provision of catalyst and distribution of the gas stream makes it possible in the context of the present invention to optimize the important operating parameters plant capacity, pressure drop and lifetime for the individual usage case, with positive side effects on ammonia production and the energy balance of the process.

What is claimed is:
1. A process for performing a water gas shift reaction, comprising:
reacting raw synthesis gas in the presence of steam and at least one water gas shift catalyst to convert carbon monoxide into carbon dioxide and to form hydrogen, wherein the raw synthesis gas is initially passed through at least one unit for high-temperature CO conversion and subsequently, downstream thereof, passed through at least two units for low-temperature CO conversion, wherein after passing through the at least one unit for high-temperature CO conversion the synthesis gas stream is divided into at least two substreams, wherein the first substream is passed through a first unit for low-temperature CO conversion wherein the first substream comprises a proportion of 95% by volume to 65% by volume of the total synthesis gas stream after the high-temperature CO conversion and the second substream is passed through a second unit for low-temperature CO conversion wherein the second substream comprises a proportion of 5% by volume to 35% by volume of the total synthesis gas stream after the high-temperature CO conversion, wherein both units for low-temperature CO conversion are arranged in parallel relative to one another.

2. The process of claim 1 wherein the entry temperature of the raw synthesis gas into the high-temperature CO conversion is in the range of 350-400° C.

3. The process of claim 1 wherein the maximum exit temperature of the synthesis gas stream from the high-temperature CO conversion is in the range of 430-450° C.

4. The process of claim 1 wherein after exiting the high-temperature CO conversion and before entering the at least two units for low-temperature CO conversion the synthesis gas stream is cooled by means of a cooling unit so that the entry temperature upon entry into the at least two units for low-temperature CO conversion is in the range from 180° C. to 220° C.

5. The process of claim 1 wherein the maximum exit temperature of the synthesis gas stream from the at least two units for low-temperature CO conversion is in the range from 220 to 240° C.

6. The process of claim 1 wherein the entry concentration of carbon monoxide in the raw synthesis gas upon entry into the high-temperature CO conversion is in the range from 10 mol % to 16 mol % and the exit concentration of carbon monoxide in the synthesis gas stream upon exiting the high-temperature CO conversion (2) and upon entering the low-temperature CO conversion is in each case in the range from 3 mol % to 5 mol %.

7. The process of claim 1 wherein the exit concentration of carbon monoxide in the synthesis gas stream upon exiting the low-temperature CO conversion is less than 0.8 mol %.

8. The process of claim 1 wherein the water gas shift reaction in the high-temperature CO conversion is carried out in the presence of an iron-containing catalyst which contains not only iron but also chromium and copper, where the latter are present in the catalyst in smaller amounts than iron.

9. The process of claim 1 wherein the water gas shift reaction in the low-temperature CO conversion is carried out in the presence of a copper-containing catalyst which contains not only copper but also zinc and aluminum, where the latter are present in the catalyst in smaller amounts than copper.

* * * * *